United States Patent
Shibuya et al.

(10) Patent No.: US 8,289,028 B2
(45) Date of Patent: Oct. 16, 2012

(54) WIRELESS COMMUNICATION DEVICE

(75) Inventors: Yasuhiro Shibuya, Kawasaki (JP); Hiroyuki Miura, Kawasaki (JP); Koji Hirai, Kawasaki (JP); Masayuki Oonuki, Kawasaki (JP); Manabu Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 374 days.

(21) Appl. No.: 12/695,498

(22) Filed: Jan. 28, 2010

(65) Prior Publication Data
US 2010/0128644 A1    May 27, 2010

Related U.S. Application Data

(63) Continuation of application No. PCT/JP2007/000846, filed on Aug. 7, 2007.

(51) Int. Cl.
*G01R 31/08* (2006.01)
*H04J 3/00* (2006.01)
*H04B 3/46* (2006.01)
*H01Q 11/12* (2006.01)

(52) U.S. Cl. ........ 324/535; 370/242; 370/280; 375/224; 455/126

(58) Field of Classification Search .................. None
See application file for complete search history.

(56) References Cited

U.S. PATENT DOCUMENTS

| | | | |
|---|---|---|---|
| 6,418,304 B1 | 7/2002 | Morrar | |
| 6,871,053 B2 * | 3/2005 | Shibuya et al. | 455/232.1 |
| 7,039,374 B2 * | 5/2006 | Hasegawa et al. | 361/695 |
| 7,205,813 B2 * | 4/2007 | Kang | 327/287 |
| 2002/0016158 A1 * | 2/2002 | Shibuya et al. | 455/232.1 |
| 2009/0137218 A1 * | 5/2009 | Honda et al. | 455/127.1 |
| 2010/0222012 A1 * | 9/2010 | Shibuya et al. | 455/79 |
| 2010/0304694 A1 * | 12/2010 | Suzuki et al. | 455/114.3 |
| 2011/0243002 A1 * | 10/2011 | Tsuruoka | 370/252 |

FOREIGN PATENT DOCUMENTS

| | | |
|---|---|---|
| JP | 61212922 | 9/1986 |
| JP | 02251072 | 10/1990 |
| JP | 11202977 | 7/1999 |
| JP | 2000101361 | 4/2000 |
| JP | 2001320244 | 11/2001 |
| JP | 2003338712 | 11/2003 |
| JP | 2004173055 | 6/2004 |
| JP | 2005348130 | 12/2005 |
| JP | 2006074673 | 3/2006 |

OTHER PUBLICATIONS

International Search Report dated Feb. 5, 2008, from the corresponding International Application No. PCT/JP2007/000846.

* cited by examiner

*Primary Examiner* — Jermele M Hollington
(74) *Attorney, Agent, or Firm* — Murphy & King, P.C.

(57) ABSTRACT

A wireless communication device performing wireless communication by switching between transmission timing and reception timing in time division, controls to supply a heater or a fan with power supplied from a power supply unit in the reception timing period, and controls to suspend supplying the heater or the fan with the power supplied from the power supply unit in the transmission timing period, in case that a temperature detected by a temperature detector is outside a specified temperature range while a time-division switchover between the transmission timing and the reception timing is performed.

7 Claims, 14 Drawing Sheets

| OUTPUT POWER | CONSUMED POWER IN HIGH OUTPUT AMPLIFIER UNIT | TEMPERATURE RISE IN TRANSMISSION AMPLIFIER |
|---|---|---|
| +40dBm | 70W | 15°C |
| +30dBm | 35W | 8°C |
| +20dBm | 35W | 8°C |
| +10dBm | 35W | 8°C |

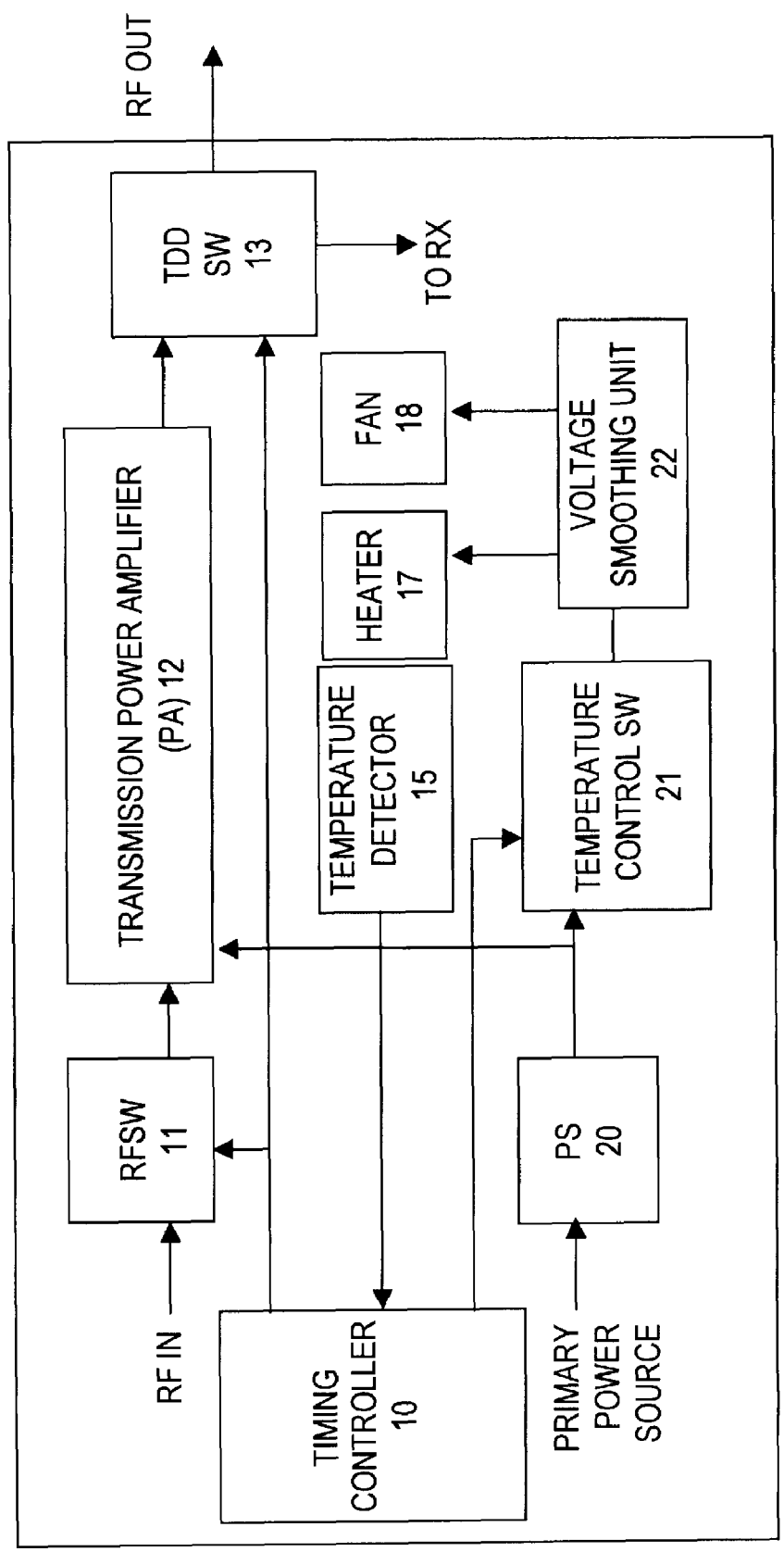

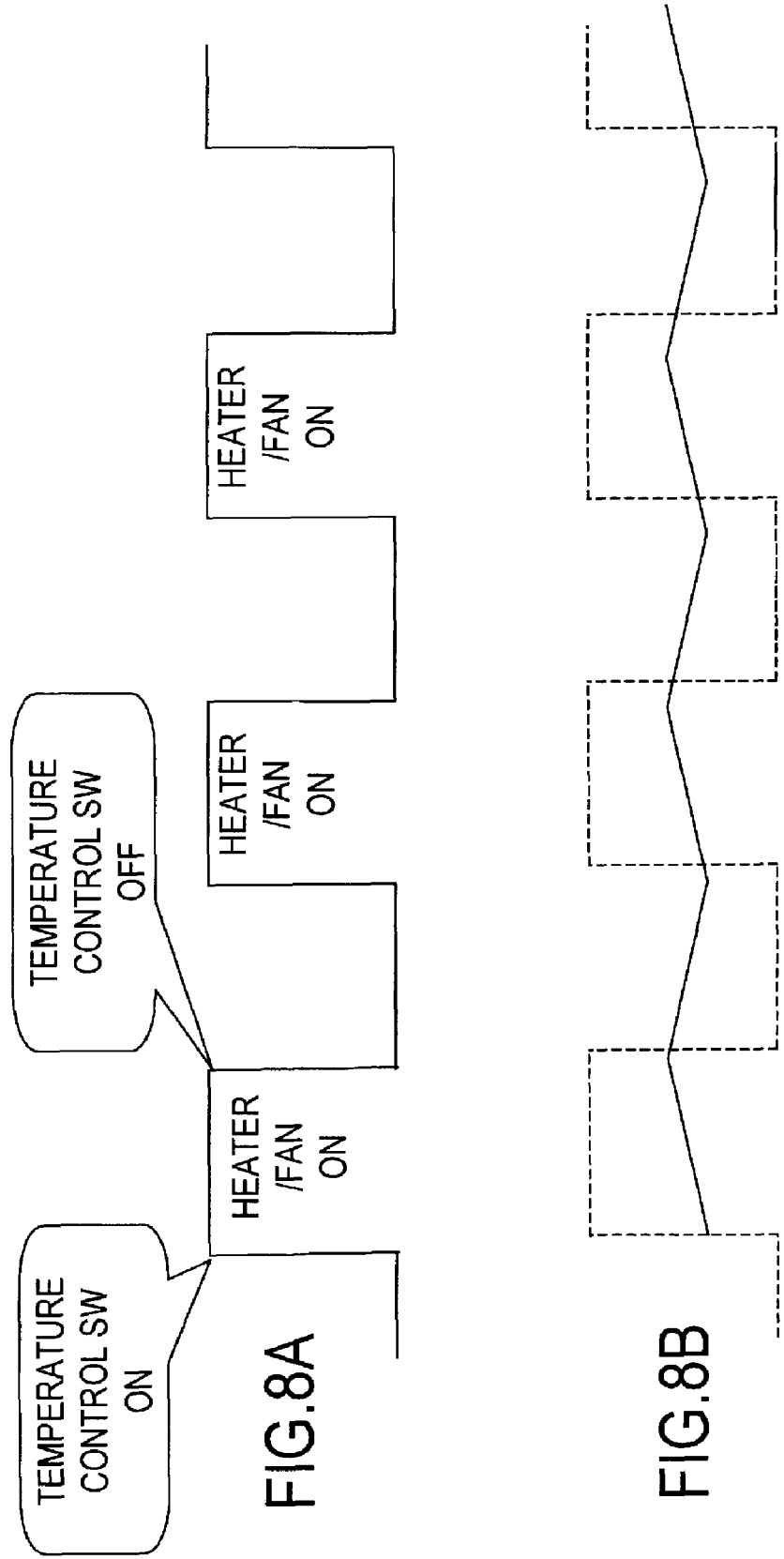

WIRELESS COMMUNICATION DEVICE

CROSS REFERENCE TO RELATED APPLICATION

This application is a continuation of International Application No. PCT/JP2007/000846, filed on Aug. 7, 2007, now pending, herein incorporated by reference.

FIELD

The present invention relates to a wireless communication device in a wireless communication system using the TDD (Time Division Duplex) system.

BACKGROUND

In a recent microwave wireless communication system, an FET capable of highly efficient operation by use of LDMOS, GaN or the like is employed, as an amplifier in a wireless communication device, such as a base station. Further, by allowing nonlinear operation at the operating point of the amplifier (class B, class C, etc.), high efficiency is achieved.

Since the amplifier has a characteristic which is varied by an operating temperature, it is preferable to maintain the operating temperature within a certain range to secure a tolerable characteristic. As a measure therefor, by the detection of the amplifier temperature, heating by a heater or cooling by a fan is performed according to the detected temperature. In particular, in regard to a base station mounted outdoors, there may be cases that the installation is made in a district beyond the range of the operating temperature of the amplifier, like in an extremely cold district of −40° C., for example. It is preferable to allow the amplifier to operate normally even when being installed in a district having such the temperature condition.

FIG. 1 is a block diagram illustrating the temperature control of the amplifier in the conventional transmission function portion of the wireless communication device. A timing controller 10 for controlling high-speed switching between transmission and reception in the TDD (Time Division Duplex) system generates a control signal for switching between transmission and reception. The control signal is supplied to a transmission switch (RFSW) 11 and a TDD switch (TDDSW) 13. The transmission switch 11 is ON during the transmission timing period, so that an RF signal is input to a transmission power amplifier (Power Amplifier: PA) 12 only during the above period. The transmission power amplifier 12 amplifies and outputs the input RF signal. During the transmission timing period, the TDD switch 13 transmits the RF signal output from the transmission power amplifier 12, and during the reception timing, the TDD switch 13 forwards a received signal to a reception function portion Rx (not illustrated in the figure).

A power supply unit (Power Supply: PS) 14 for amplifier supplies the transmission power amplifier 12 with power (current). Since the transmission power amplifier 12 is an amplifier performing nonlinear operation, the transmission power amplifier 12 consumes the current (power) supplied from the power supply unit 14 for amplifier, only in the period when the RF signals are input to the transmission power amplifier 12, and however, consumes only an idle current, which is extremely small, when there is no RF signal input. Further, a temperature detector 15 detects the temperature of the transmission power amplifier 12. When the detected temperature is lower than a threshold temperature for heater, the temperature detector 15 initiates a power supply unit 16 for temperature control. The power supply unit 16 for temperature control then supplies a heater 17 with power, so that the transmission power amplifier 12 is heated by the heater 17. Then, when the detected temperature becomes higher than the threshold temperature for heater, the power supply unit (Power Supply: PS) 16 for temperature control suspends the power supply to the heater 17. Similarly, when the detected temperature is higher than a threshold temperature for fan, the temperature detector 15 initiates the power supply unit 16 for temperature control. The power supply unit 16 for temperature control supplies a fan 18 with power, so that the transmission power amplifier 12 is cooled by the fan 18. Then, when the detected temperature becomes lower than the threshold temperature for fan, the power supply unit 16 for temperature control suspends the power supply to the fan 18.

FIGS. 2A-2C are diagrams illustrating a load variation at the time of switching over the transmission/reception timing. When the transmission and the reception are switched over at high speed in the TDD system, at the timing of switching over between the transmission and the reception [FIG. 2A], an instantaneous current variation (inrush current) occurs in the power supply unit 14 for amplifier because of the load variation caused by the inrush or the disconnection of an input signal to the transmission power amplifier 12 [FIG. 2B]. At this time, because of incapability to respond to the above variation at high speed, the power supply unit 14 for amplifier produces an instantaneous voltage variation (voltage drop) in the transmission power amplifier 12 [FIG. 2C], and as a result, may possibly produce malfunction in the operation of the transmission power amplifier 12. For this reason, by mounting a capacitor having a large capacity on a power line of the transmission power amplifier 12, it is required to suppress the variation in the bias voltage for the transmission power amplifier 12.

Now, in the patent documents 1 and 2 illustrated below, there is disclosed a technique for increasing temperature to an operating temperature by self-heating an amplifier. Also, with regard to a cooling unit for tuner, VCR, video disk recorder, or the like, having a drive unit (for an electric open/close door, a loading tray, etc), the patent document 3 illustrated below discloses a configuration to suspend the operation of a cooling fan when the drive unit is in operation. With regard to a fan motor controller for cooling the inside of an electronic apparatus, the patent document 4 illustrated below discloses a configuration to drive a plurality of cooling fans in time division.

[Patent document 1] Japanese Laid-open Patent Publication No. 2004-173055.
[Patent document 2] Japanese Laid-open Patent Publication No. 2005-348130.
[Patent document 3] Japanese Laid-open Patent Publication No. 02-251072.
[Patent document 4] Japanese Laid-open Patent Publication No. 11-202977.

In the amplifier performing nonlinear operation, when there is no signal input, current consumed in the amplifier itself is extremely small, providing no means for heat generation. Therefore, when an operating environment temperature is lower than a specified temperature required for a stable amplifier operation, it is required to heat by means of the heater 17 etc., as described above. Also, when the operating environment temperature is higher than a tolerable temperature, it is required to radiate heat by means of the fan 18.

Accordingly, it is required to provide the power supply unit 16 for temperature control to supply the heater 17 and the fan 18 with power, independently of the power supply unit 14 for amplifier. This causes an increased mounting area and an increased cost, and also necessitates extra power consumed when driving the heater 17 or the fan 18.

Further, in case of the self-heating as illustrated in the aforementioned patent documents 1 and 2, although there is a merit of no need of mounting the heater, intrinsic amplification operation cannot be performed during the self-heating (the patent document 1), and an input of a signal other than the RF signal to the amplifier is required (the patent document 2), and further, cooling operation cannot be attained at the time of high temperature.

Furthermore, in order to secure a stable TDD operation, it is required to mount a capacitor having a large capacity, as described above. In recent years, a high voltage device of GaN or the like has been adopted in the amplifier 12. This requires a high voltage-resistant capacitor, causing a difficulty in securing sufficient capacitor reliability, and also, bringing about an increased mounting area because of a larger capacitor size.

SUMMARY

According to an aspect of the invention, a wireless communication device in one mode of the invention to attain the above objects is the wireless communication device, which performs wireless communication by switching between transmission timing and reception timing in time division, includes: an amplifier for amplifying a transmission signal in a transmission timing period; a temperature detector for detecting temperature of the amplifier; at least one of a heater for heating the amplifier and a fan for cooling the amplifier; a power supply unit for supplying the amplifier with power; and a timing controller for supplying the heater or the fan with power supplied from the power supply unit in the reception timing period, and for suspending supplying the heater or the fan with the power supplied from the power supply unit in the transmission timing period, in case that the temperature detected by the temperature detector is outside a specified temperature range while a time-division switchover between the transmission timing and the reception timing is performed.

According to an aspect of the invention, a wireless communication device in one mode of the invention is the wireless communication device, which performs wireless communication by switching between transmission timing and reception timing in time division, includes: an amplifier for amplifying a transmission signal in a transmission timing period; a fan for cooling the amplifier; a power supply unit for supplying the amplifier with power; and a timing controller for supplying the fan with power supplied from the power supply unit in the reception timing period, and suspending supplying the fan with the power supplied from the power supply unit in the transmission timing period.

According to an aspect of the invention, a wireless communication device is one mode of the invention is the wireless communication device, which performs wireless communication by switching between transmission timing and reception timing in time division, includes: an amplifier for amplifying a transmission signal in a transmission timing period; a temperature detector for detecting temperature of the amplifier; a power supply unit for supplying the amplifier with power; a first bias voltage generator for generating a first bias voltage to allow the amplifier to perform nonlinear operation; a second bias voltage generator for generating a second bias voltage to allow the amplifier to perform linear operation; and a timing controller for supplying the amplifier with the second bias voltage in the reception timing period, and for supplying the amplifier with the first bias voltage in the transmission timing period, in case that the temperature detected by the temperature detector is outside a specified temperature range while a time-division switchover between the transmission timing and the reception timing is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7 is a block diagram illustrating a second exemplary configuration of the wireless communication device according to an embodiment of the present invention.

FIGS. 8A-8B are timing charts indicating ON/OFF of the temperature control switch 21 and the supplied voltage.

DESCRIPTION OF EMBODIMENT(S)

The preferred embodiments of the present invention will be explained with reference to accompanying drawings.

In a nonlinear (class B, class C, etc.) amplifier, current is not consumed virtually (only an extremely small idle current is consumed) when no signal is input, and current which is to be consumed when an input signal exists becomes a surplus. In the wireless communication device performing communication by means of the TDD system, in which transmission and reception are switched at high speed, because no transmission is performed during a reception timing period (downlink), no RF signal is input to a transmission power amplifier, nonlinear amplifier. Accordingly, during the reception timing period (downlink), current as much as that to be consumed during a transmission timing period (uplink) becomes a surplus.

According to the present invention, in the communication of the TDD system, by taking attention to a surplus current (surplus power) produced in the reception timing period (downlink), the operating temperature of the transmission power amplifier is controlled by supplying a heater or a fan with the surplus current (surplus power) produced in the reception timing period (downlink).

Figure 3:
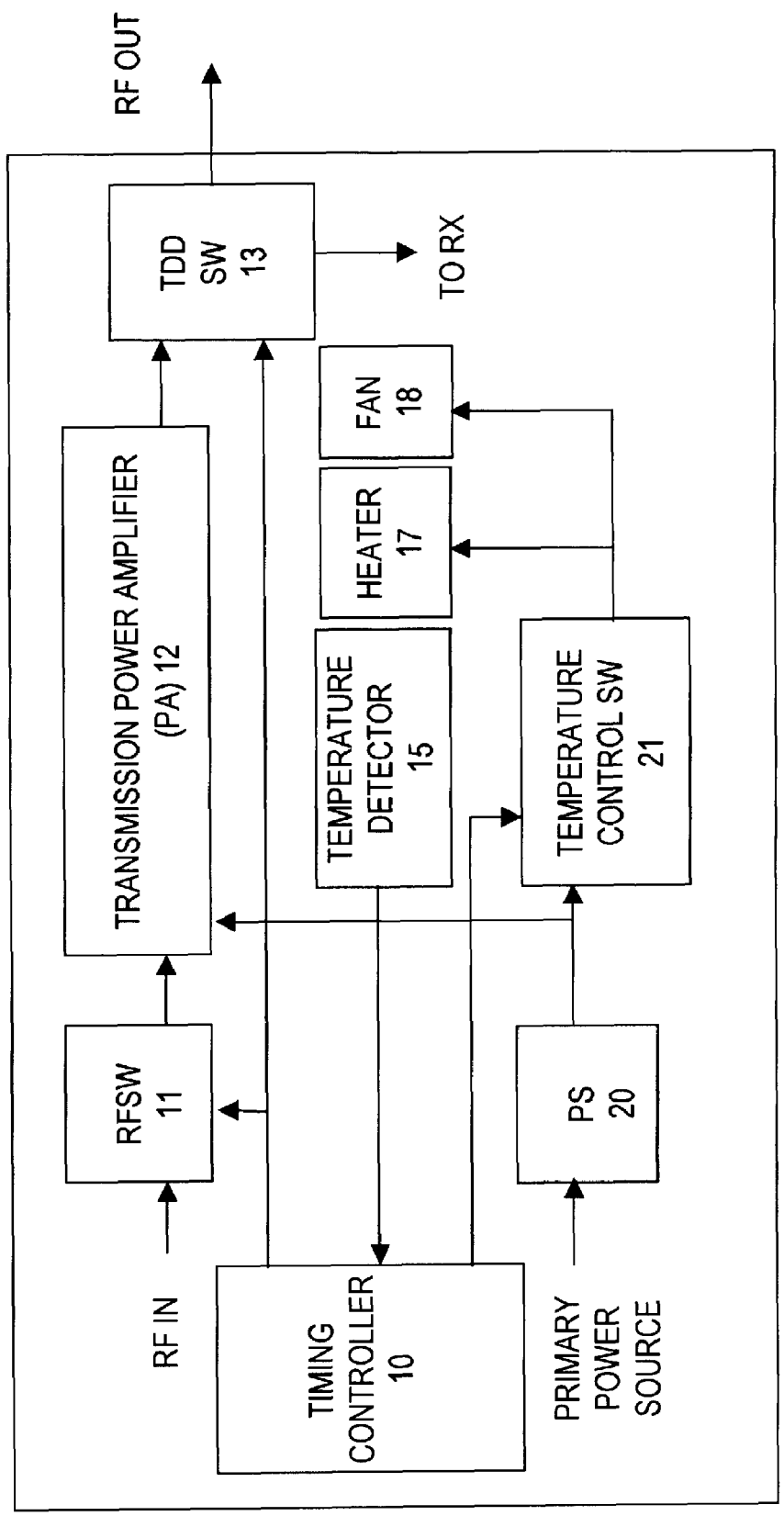
FIG. 3 is a block diagram illustrating a first exemplary configuration of the wireless communication device, according to an embodiment of the present invention.

FIG. 3 is a block diagram illustrating a first exemplary configuration of the wireless communication device, according to an embodiment of the present invention. A timing controller 10, which controls high speed switching between transmission and reception in the TDD system, generates a control signal for transmission/reception switchover. The control signal is then supplied to transmission switch 11, TDD switch 13 and temperature control switch 21. The transmission switch 11 is ON during the transmission timing period (uplink), and only during the above period, the RF signal is input to a transmission power amplifier 12. The transmission power amplifier 12 amplifies the input RF signal and outputs it. During the transmission timing period (uplink), the TDD switch 13 transmits the RF signal being output from the transmission power amplifier 12, and during the reception timing period (downlink), transmits the received signal to a reception function portion RX (not illustrated in the figure).

A power supply unit (Power Supply: PS) 20 supplies the transmission power amplifier (Power Amplifier: PA) 12 with power (current). Because of a nonlinear amplifier, the transmission power amplifier 12 consumes current (power) supplied from the power supply unit 20 only during the period in which RF signals are input to the transmission power amplifier 12, and consumes only an extremely small idle current when no RF signal is input. Therefore, power is surplus in the reception timing period when no RF signal is input to the transmission power amplifier 12.

Therefore, according to this first exemplary configuration, a temperature detector 15 detects the temperature of the transmission power amplifier 12, and the detected temperature information is input to the timing controller 10. If the detected temperature is decided to be a temperature requiring heating by the heater 17, or a temperature requiring cooling by the fan 18, the timing controller 10 controls a temperature control switch 21 so that power is supplied to the heater 17 or the fan 18 only during the reception timing period.

Figure 4:
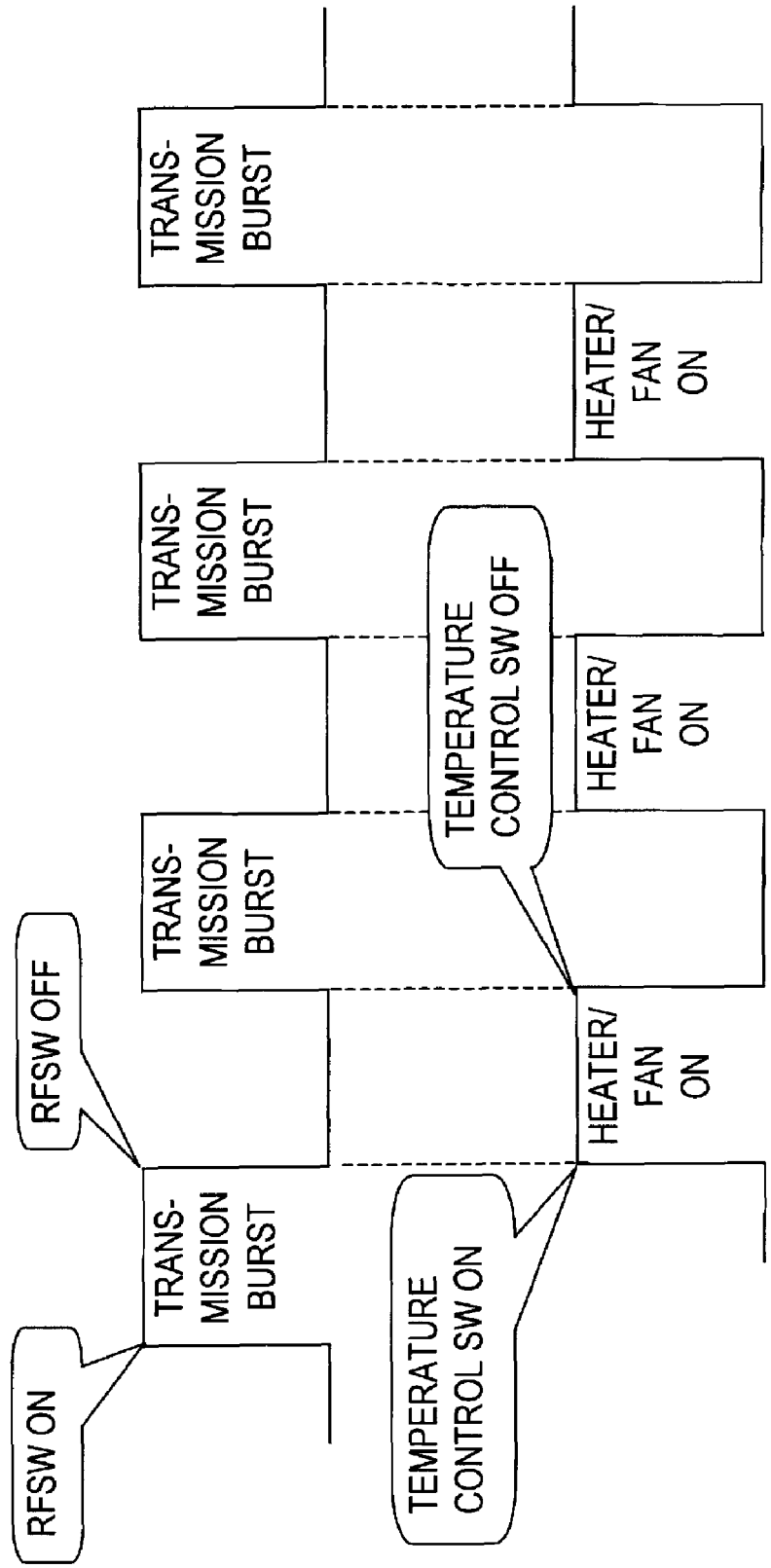
FIG. 4 is an ON/OFF timing chart of the temperature control switch 21.

FIG. 4 is an ON/OFF timing chart of the temperature control switch 21. When the detected temperature is lower than a threshold temperature for heater, at the time of starting the reception timing period, the timing controller 10 sets the temperature control switch 21 ON, so as to control to supply the heater 17 with power from the power supply unit 20, as illustrated in FIG. 4. Also, at the time of completing the reception timing period, the timing controller 10 sets the temperature control switch 21 OFF, so as to control to suspend the power supply to the heater 17, and thereby power is supplied only during the reception timing period. Then, when the detected temperature becomes higher than the threshold temperature for heater, the timing controller 10 does not set the temperature control switch 21 ON even in the reception timing period, so that the power supply to the heater 17 is suspended.

Similarly, when the detected temperature is higher than a threshold temperature for fan, at the time of starting the reception timing period, the timing controller 10 sets the temperature control switch 21 ON, so as to control to supply the fan 18 with power from the power supply unit 20. Also, at the time of completing the reception timing period, the timing controller 10 sets the temperature control switch 21 OFF, so as to control to suspend the power supply to the fan 18, and thereby power is supplied only during the reception timing period. Then, when the detected temperature becomes lower than the threshold temperature for fan, the timing controller 10 does not set the temperature control switch 21 ON even in the reception timing period, so that the power supply to the fan 18 is suspended.

As such, by utilizing the power in the reception timing period in which the transmission power amplifier 12 does not consume power, the power supplied from the power supply for supplying power to the transmission power amplifier 12 is supplied to the heater 17 or the fan 18, so as to drive the heater 17 or the fan 18. Thus, a dedicated power supply to drive the heater 17 or the fan 18 becomes unnecessary. Also, in the transmission timing, power consumption can be reduced because power is not supplied to the transmission power amplifier 12 and the heater 17 or the fan 18 simultaneously.

Also, even during the reception timing period, power is consumed in the heater 17 or the fan 18, and therefore, it is possible to reduce variation in current and voltage in the power supply unit 20 at the time of switching over between the transmission timing and the reception timing. Accordingly, a capacitor of large capacity to reduce the variation of the current and the voltage becomes unnecessary, and thus, cost reduction and saving of a mounting area can be achieved.

Figure 5:
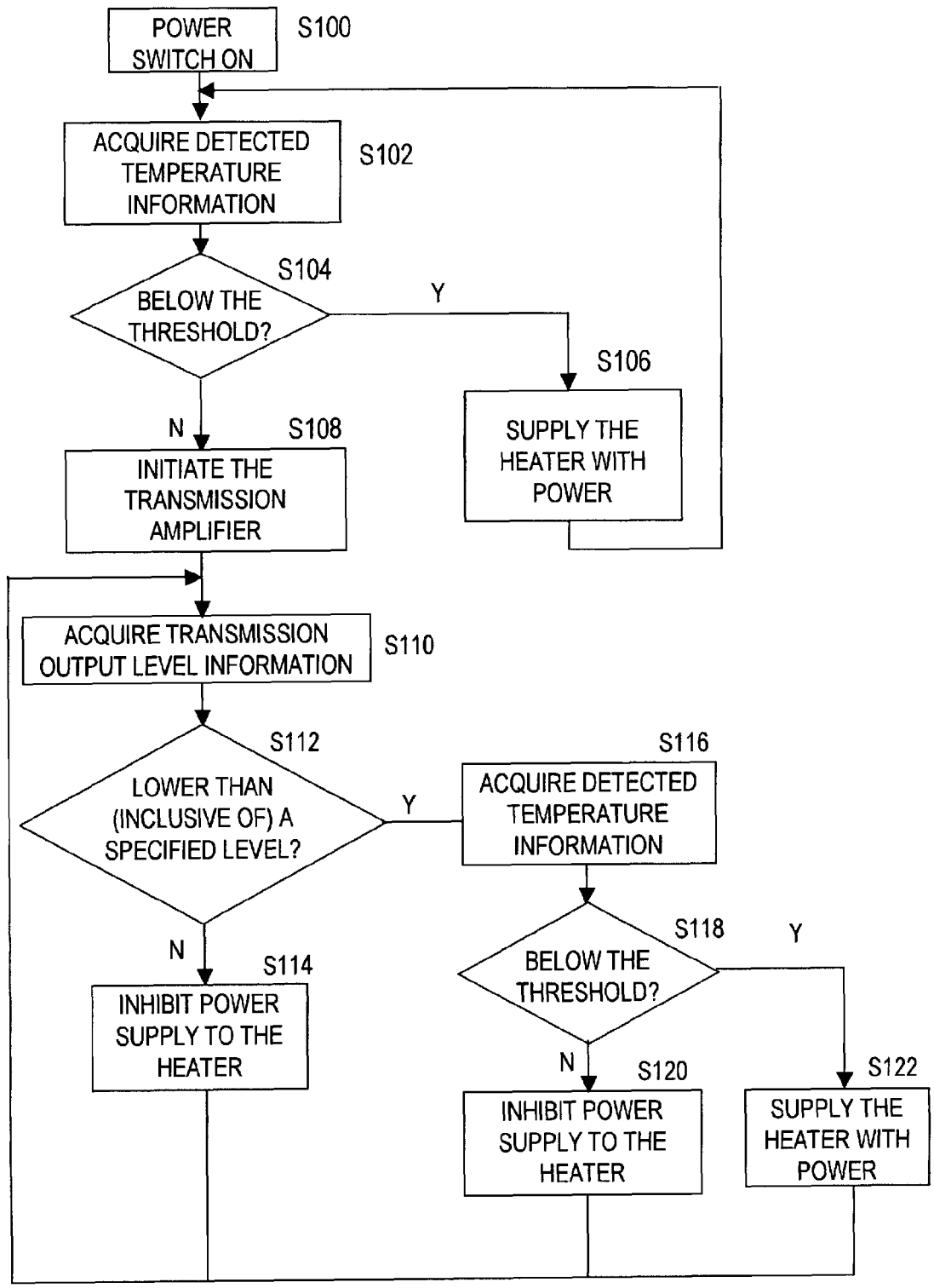
FIG. 5 is a temperature control flowchart of the timing controller 10.

FIG. 5 is a temperature control flowchart of the timing controller 10. In the flowchart illustrated in FIG. 5, description is given to the case of driving the heater 17, which is also applicable to the drive of the fan 18. By that a power switch of the wireless communication device is switched on, a wireless communication device starts initiation (S100). The timing controller 10 first acquires detected temperature information from the temperature detector 15 (S102), and decides whether the detected temperature is lower than the threshold temperature for heater (S104). If the temperature is not lower than the threshold temperature for heater, the timing controller 10 sets the transmission switch 11 ON, and initiates the transmission power amplifier 12 (S108). Thus, wireless communication by TDD is started, and the processing is moved to S110 and after, which will be described later.

On the other hand, when the detected temperature is lower than the threshold temperature for heater, the temperature control switch 21 is set ON while the transmission switch 11 is kept OFF. Since the transmission switch 11 is kept OFF, the transmission power amplifier 12 consumes quite small power corresponding to an idle current. The power supplied from the power supply unit 20 is supplied to the heater 17 virtually entirely, and the transmission power amplifier 12 is heated by the heater 17 (S106).

The timing controller 10 acquires detected temperature information at specified intervals (S102), and continues setting the transmission switch 11 OFF and the temperature control switch 21 ON while the temperature is lower than the threshold temperature for heater, so that the transmission power amplifier 12 is kept heated until the temperature thereof becomes the threshold temperature for heater. In S104, when the detected temperature information comes to the threshold temperature for heater or higher, the timing controller 10 sets the temperature control switch 21 OFF, so as to suspend the power supply to the heater 17. Further, the timing controller 10 sets the transmission switch 11 ON, so as to initiate the transmission power amplifier 12 (S108), and thus, communication by TDD is started. Namely, by alternately switching the transmission switch 11 ON and OFF, the transmission timing and the reception timing are switched over.

On initiating the transmission power amplifier 12, the timing controller 10 acquires transmission output level information of the transmission power amplifier 12 (S110). To the wireless communication device, the transmission output level information is preset, and stored in a memory (not illustrated in the figure) of the wireless communication device. The timing controller 10 reads out the transmission output level information from the memory of the wireless communication device.

Figure 1:
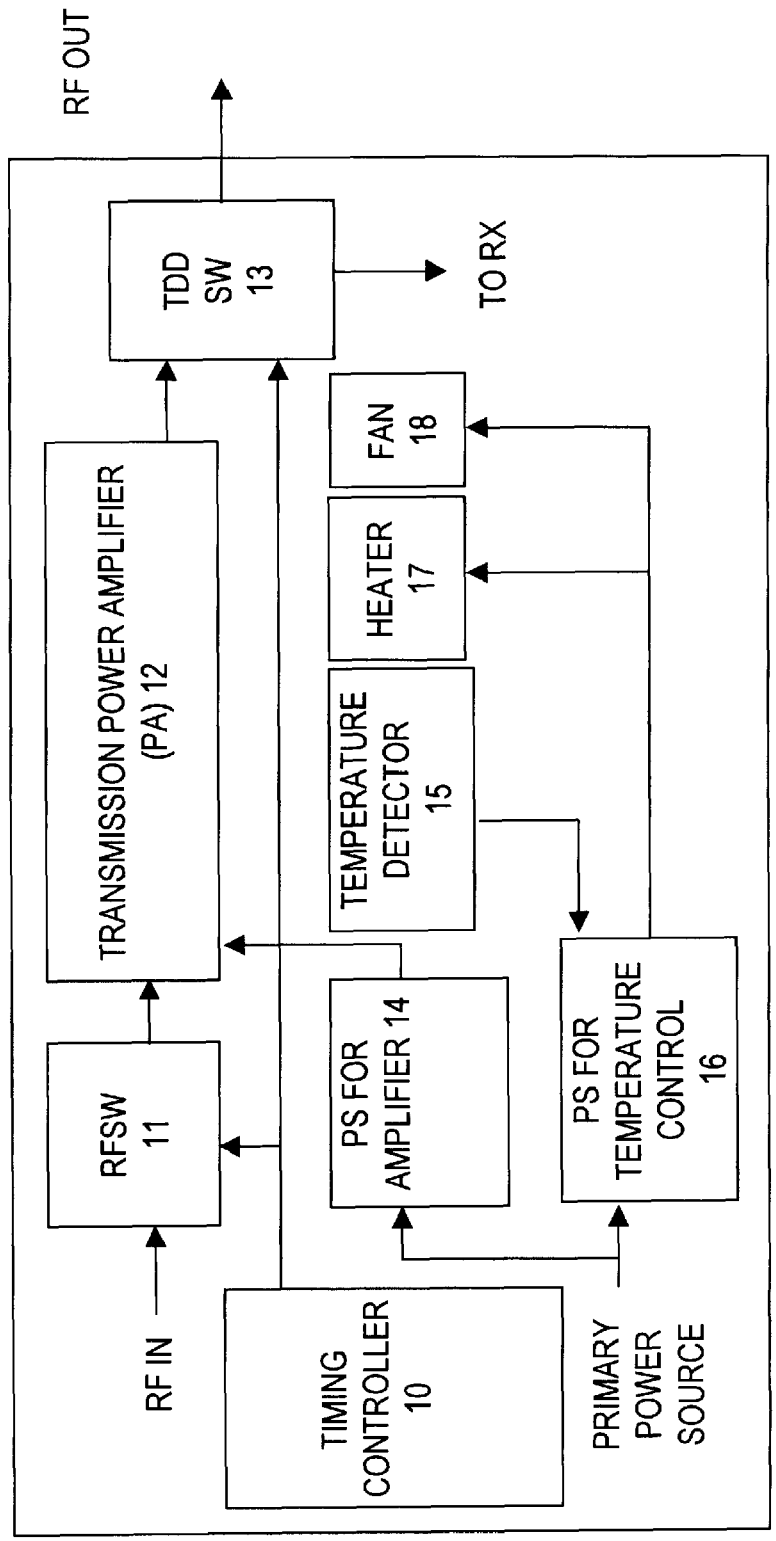
FIG. 1 is a block diagram illustrating the temperature control of the amplifier in the conventional transmission function portion of the wireless communication device.
Figure 2:
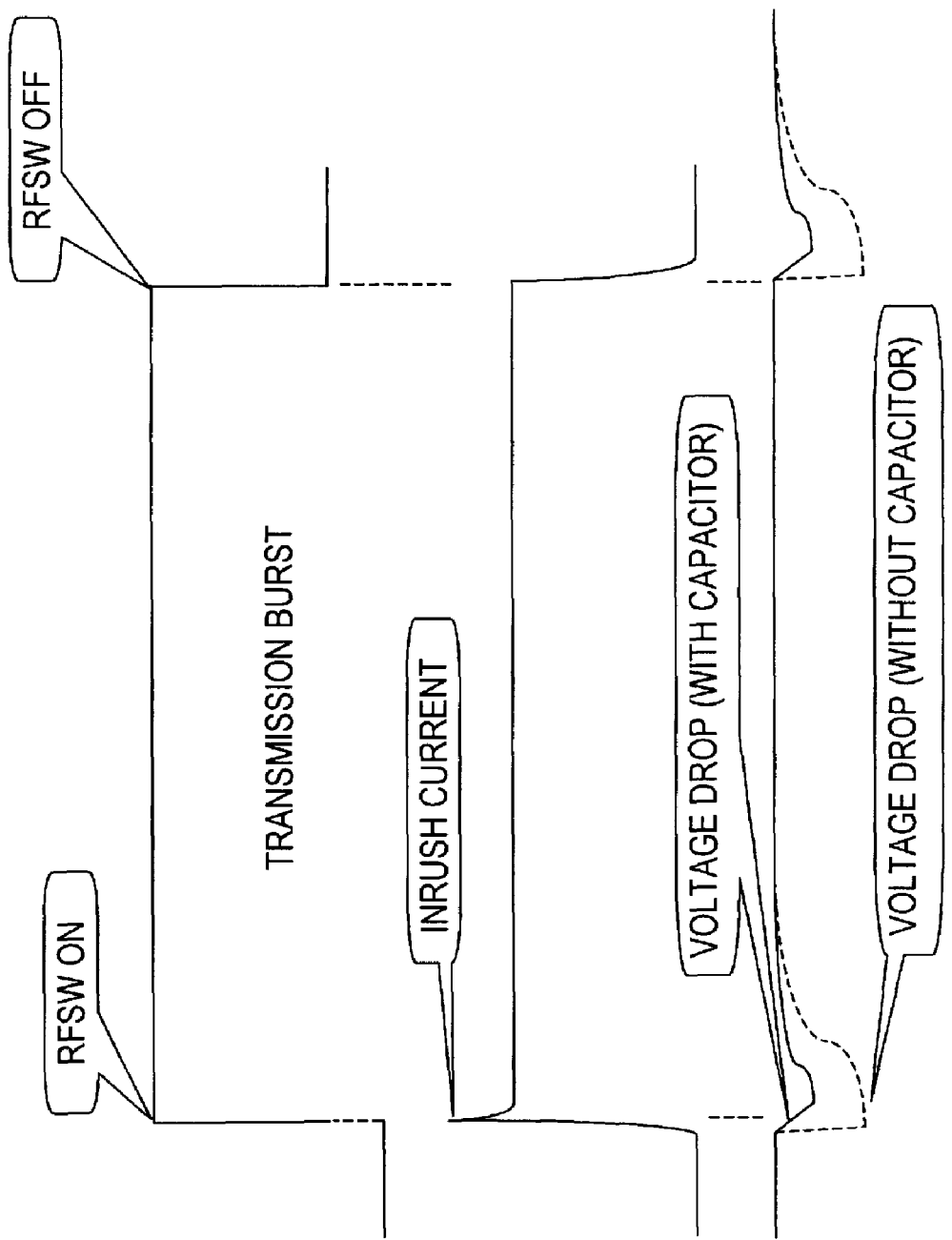
FIG. 2 are diagrams illustrating a load variation at the time of switching over the transmission/reception timing.

When the transmission output level is a specified level (+30 dBm, for example) or lower, the transmission power amplifier 12 cannot be maintained in the threshold temperature for heater or higher by self-heating the transmission power amplifier 12. Accordingly, the timing controller 10 performs the temperature control described in the above FIG. 3 and FIG. 4, according to the present invention. On the other hand, when the transmission output level is higher than a specified level (+30 dBm, for example), the transmission power amplifier 12 can be maintained in the threshold temperature for heater or higher, by self-heating the transmission power amplifier 12. Accordingly, the temperature control described in the above FIG. 1 and FIG. 2 is not performed. Namely, irrespective of the detected temperature, the temperature control switch 21 is not set ON even in the reception timing period (S114), and heating by the heater 17 is not performed.

Figures 6A, 6B:
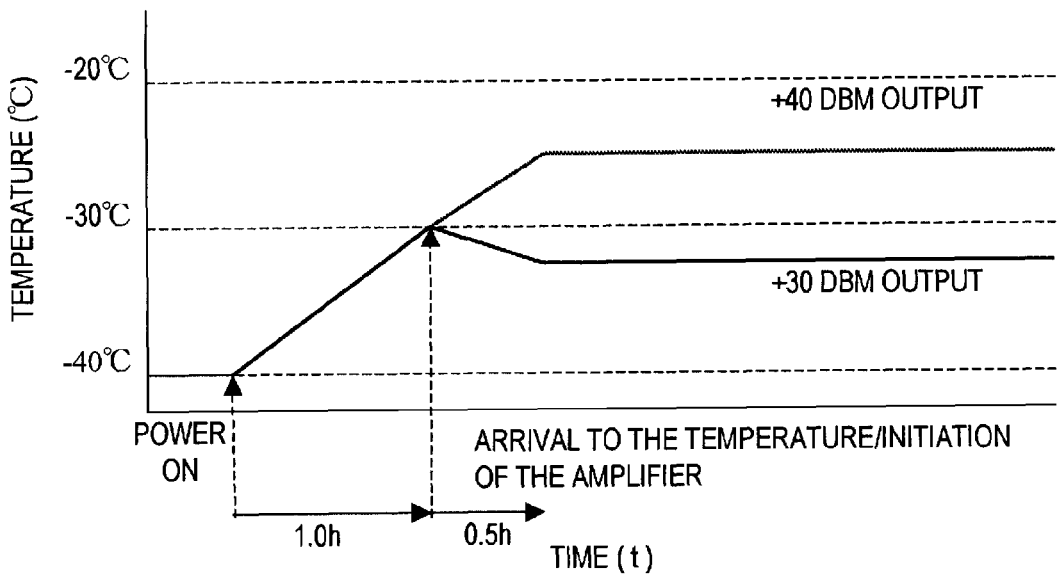
FIGS. 6A-6B are diagrams illustrating a transmission output level and a temperature rise of the transmission power amplifier 12.

FIGS. 6A-6B are diagrams illustrating a transmission output level and a temperature rise of the transmission power amplifier 12. It is assumed that the output of the transmission power amplifier 12 is variable from +40 dBm maximum to +10 dBm minimum. Because the transmission power amplifier 12 is a nonlinear amplifier, the consumed power varies with the output level. The table in FIG. 6A illustrates relationship between the transmission output level and the consumed power. At the time of the output of +40 dBm, the consumed power is 70 W. By the self-heat generation caused by the consumed power of 70 W, the temperature of the transmission power amplifier 12 is increased by 15° C. On the other hand, in case the output level is +30 dBm or lower, the consumed power becomes 35 W. In this case, the temperature rise caused by the self-heat generation remains as low as 8° C.

Here, the transmission power amplifier 12 has a property guarantee temperature (threshold temperature for heater) higher than and inclusive of −30° C., and however, as the specification of the wireless communication device itself, operation in the external environment as low as −40° C. is assumed. When the operation is started at the external environmental temperature of −40° C., according to the processing of the steps S101-S108 in FIG. 5, power from the power supply unit 20 is supplied to the heater 17, and by applying heat by the heater 17, the temperature of the transmission power amplifier 12 is increased to −30° C. At that time point, in FIG. 6B, the transmission power amplifier 12 is initiated, and wireless communication by TDD is started accordingly. At this time, when the transmission output level is set to be +40 dBm, the property guarantee temperature of −30° C. can be maintained because only by the self-heating of the transmission power amplifier 12, the temperature can be increased by 15° C. relative to the outer air temperature. On the other hand, when the transmission output level is +30 dBm or lower, a temperature rise as small as 8° C. relative to the outer air temperature can only be made by the self-heating. As a result, once after the temperature rises up to −30° C., the temperature of the transmission power amplifier 12 becomes lower than −30° C., because of a shortage of heat quantity. Thus, in case the transmission output level is +40 dBm, it is not necessary to perform the temperature control according to the present invention to heat by a heater only in the reception timing during communication by TDD. In contrast, in case the transmission output level is +30 dBm or lower, it becomes suitable to perform the temperature control according to the present embodiment, as described above in FIG. 3 and FIG. 4, in order to maintain the temperature of the transmission power amplifier 12 to be the property guarantee temperature or higher.

Referring back to FIG. 5, in the step S112, when the transmission output level of the transmission power amplifier 12 is lower than and inclusive of a specified level (+30 dBm, for example), the timing controller 10 acquires detected temperature information from the temperature detector 15 (S116), decides whether the detected temperature is lower than the threshold temperature for heater (S118). If the detected temperature is the threshold temperature for heater or higher, irrespective of being in the reception timing, the timing controller 10 keeps the temperature control switch 21 OFF (S120), without heating by the heater 17. On the other hand, when the detected temperature is lower than the threshold temperature for heater, the timing controller 10 sets the temperature control switch 21 ON only during the reception timing period, so that power is supplied to the heater 17, and thereby heating by the heater 17 is performed (S122).

The timing controller 10 acquires detected temperature information at certain intervals (S116), and while the detected temperature is lower than the threshold temperature for heater, the timing controller 10 sets the temperature control switch 21 ON only during the reception timing period (the period in which the transmission switch 11 is OFF), and continues heating until the temperature of the transmission power amplifier 12 reaches the threshold temperature for heater.

FIG. 7 is a block diagram illustrating a second exemplary configuration of the wireless communication device according to an embodiment of the present invention. As compared to the first exemplary configuration illustrated in FIG. 3, the second exemplary configuration includes a voltage smoothing unit 22 for smoothing voltage to be supplied to the heater 17 or the fan 18. In the first exemplary configuration illustrated in FIG. 3, the voltage to be supplied to the heater 17 or the fan 18 has a pulse waveform having a period equal to the transmission/reception switchover period, as illustrated in FIG. 4. By means of the voltage smoothing unit 22, such the pulse waveform is smoothed, which is then converted into a direct-current voltage. The above voltage is supplied to the heater 17 or the fan 18. The conversion to the direct-current voltage is useful to improve both reliability of the heater 17 or the fan 18 and flexibility in component selection.

FIGS. 8A-8B are timing charts indicating ON/OFF of the temperature control switch 21 and the supplied voltage. When the temperature control switch 21 performs ON/OFF operation as illustrated in FIG. 8A, with the provision of the voltage smoothing unit 22, the voltage waveform to be supplied is converted into a waveform (solid line) which is smoothed from the pulse waveform (dotted line) as illustrated in FIG. 8B, and thus, voltage is supplied even during the transmission timing period. In other words, the heating and the cooling are continuously performed over the reception timing period and the transmission timing period.

Figure 9:
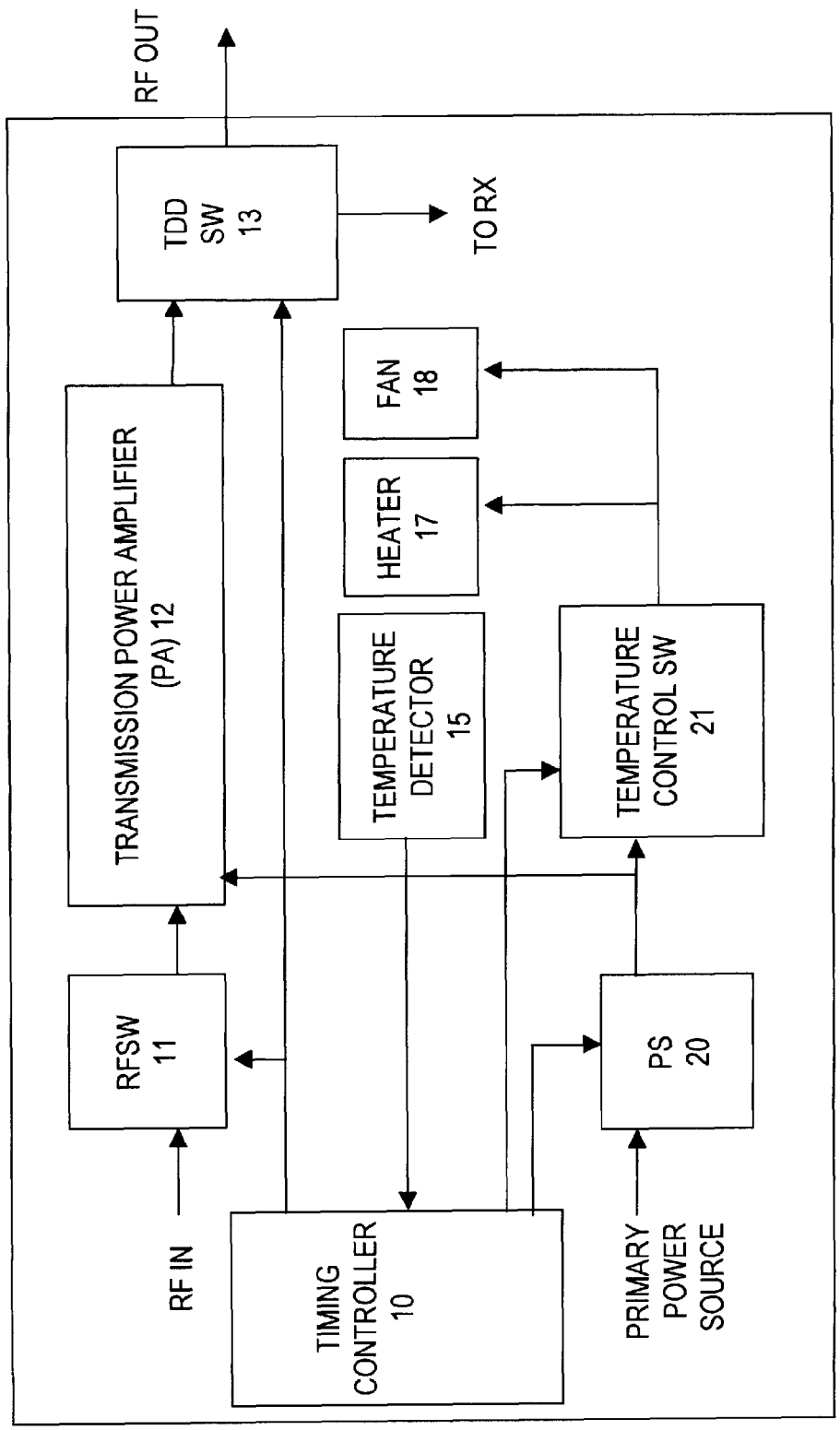
FIG. 9 is a block diagram illustrating a third exemplary configuration of the wireless communication device according to an embodiment of the present invention.

FIG. 9 is a block diagram illustrating a third exemplary configuration of the wireless communication device according to an embodiment of the present invention. As compared to the first exemplary configuration illustrated in FIG. 3, in the third exemplary configuration, the temperature control according to the first exemplary configuration is performed, and also, the timing controller 10 varies the output voltage of the power supply unit 20 based on the detected temperature information.

Figure 10:
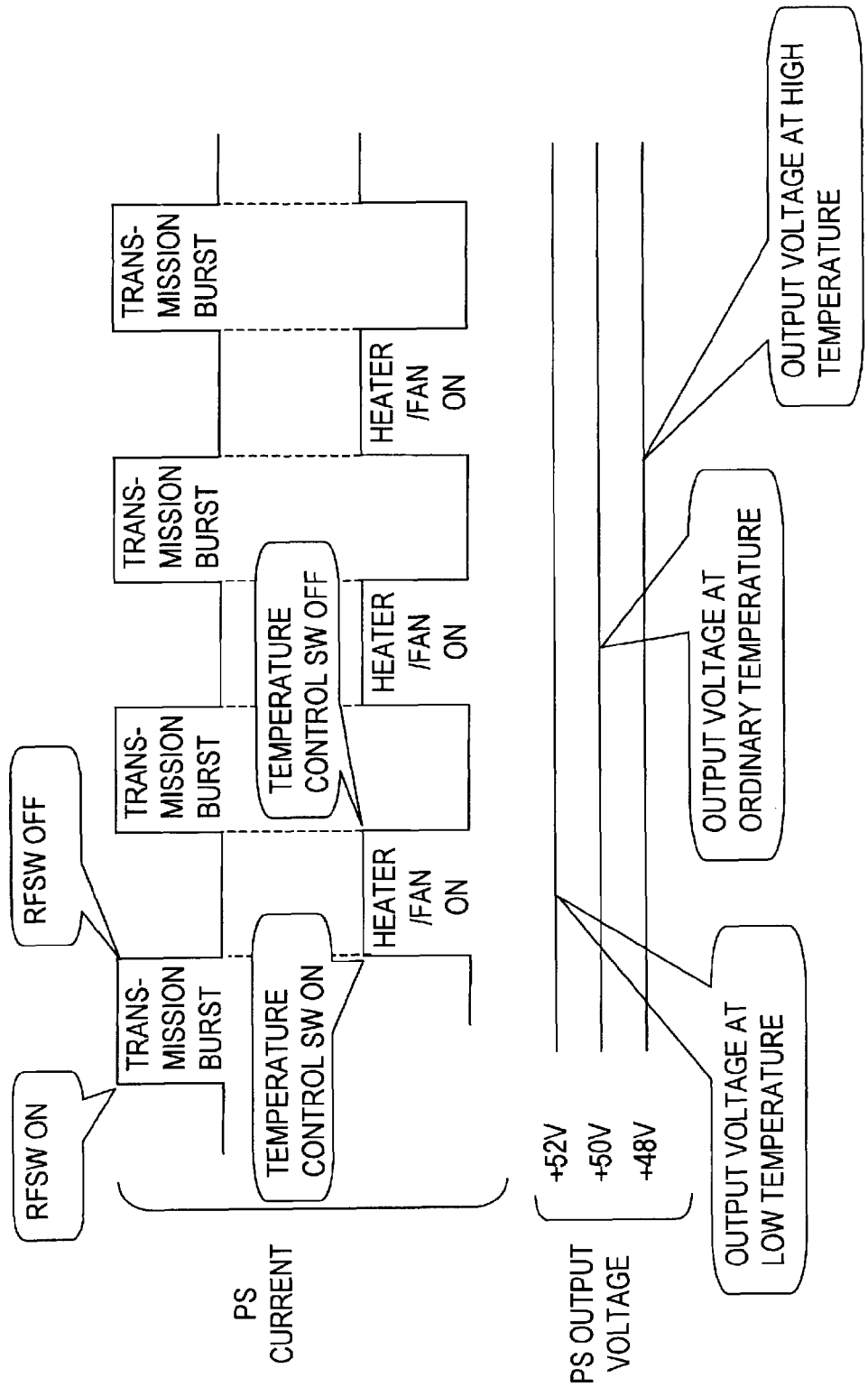
FIG. 10 is a diagram illustrating an output voltage variation of the power supply unit 20.

FIG. 10 is a diagram illustrating an output voltage variation of the power supply unit 20. More specifically, in case that the output voltage of the power supply unit 20 is, for example, 50 V at an ordinary time (ordinary time corresponds to a case that the detected temperature is not lower than the threshold temperature for heater, and not higher than the threshold temperature for fan), when the temperature (detected temperature) of the transmission power amplifier 12 is lower than the threshold temperature for heater, the output voltage of the power supply unit 20 is made higher (for example, to 52 V) than the output voltage at the ordinary time. Also, when the temperature (detected temperature) of the transmission power amplifier 12 is higher than the threshold temperature for fan, the output voltage of the power supply unit 20 is made lower (for example, to 48 V) than the output voltage at the ordinary time. By making variable the output voltage of the transmission power amplifier 12 according to the temperature thereof, it becomes possible to suppress the characteristic variation of the transmission power amplifier 12, which is useful to improve the characteristic.

Figure 11:
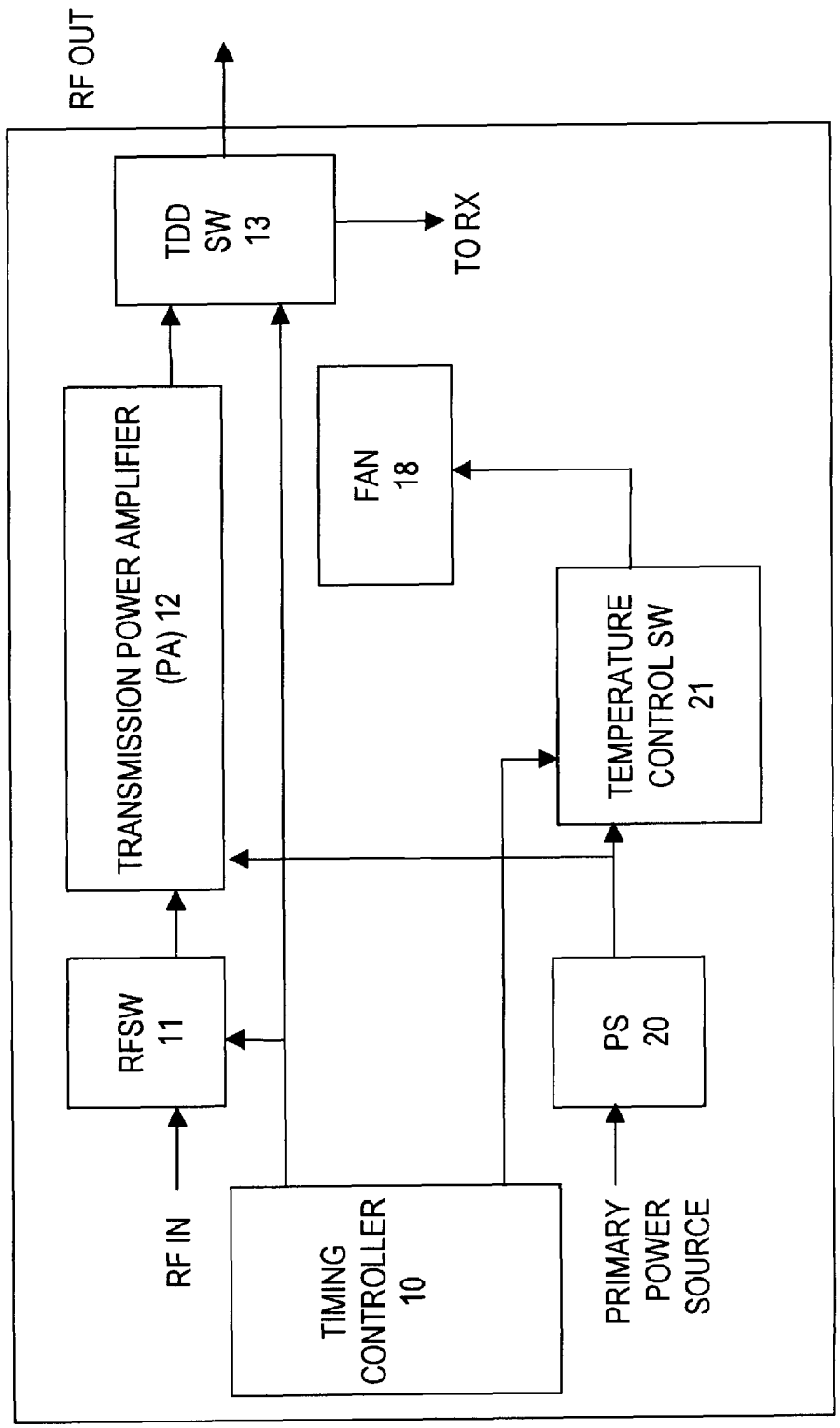
FIG. 11 is a block diagram illustrating a fourth exemplary configuration of the wireless communication device according to an embodiment of the present invention.

FIG. 11 is a block diagram illustrating a fourth exemplary configuration of the wireless communication device according to an embodiment of the present invention. As compared to the first exemplary embodiment illustrated in FIG. 3, in the fourth exemplary configuration, the temperature detector 15 is not provided. Irrespective of the temperature of the transmission power amplifier 12, cooling operation by the fan 18 is performed continuously over the reception timing period.

Figure 12:
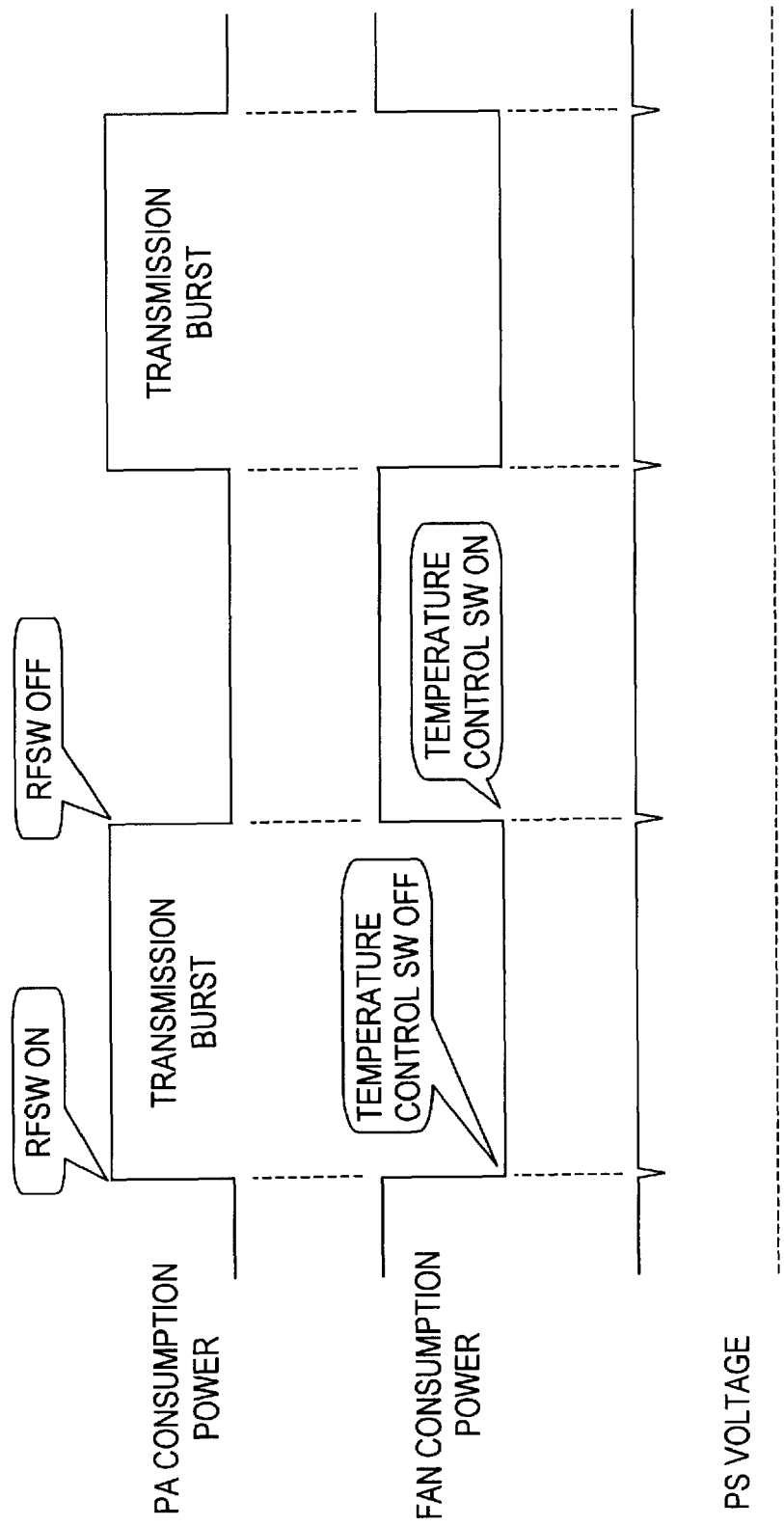
FIG. 12 is an operating timing chart of the fan 18.

FIG. 12 is an operating timing chart of the fan 18. During the reception timing period, power is supplied to the fan 18, so as to drive the fan 18. During the reception timing period, power is hardly consumed in the transmission power amplifier 12. However, in place thereof, the fan 18 consumes power, which can reduce variation in current and voltage of the power supply unit 20 at the time of switching over the transmission/reception timing. This makes it unnecessary to provide a capacitor having a large capacity.

Figure 13:
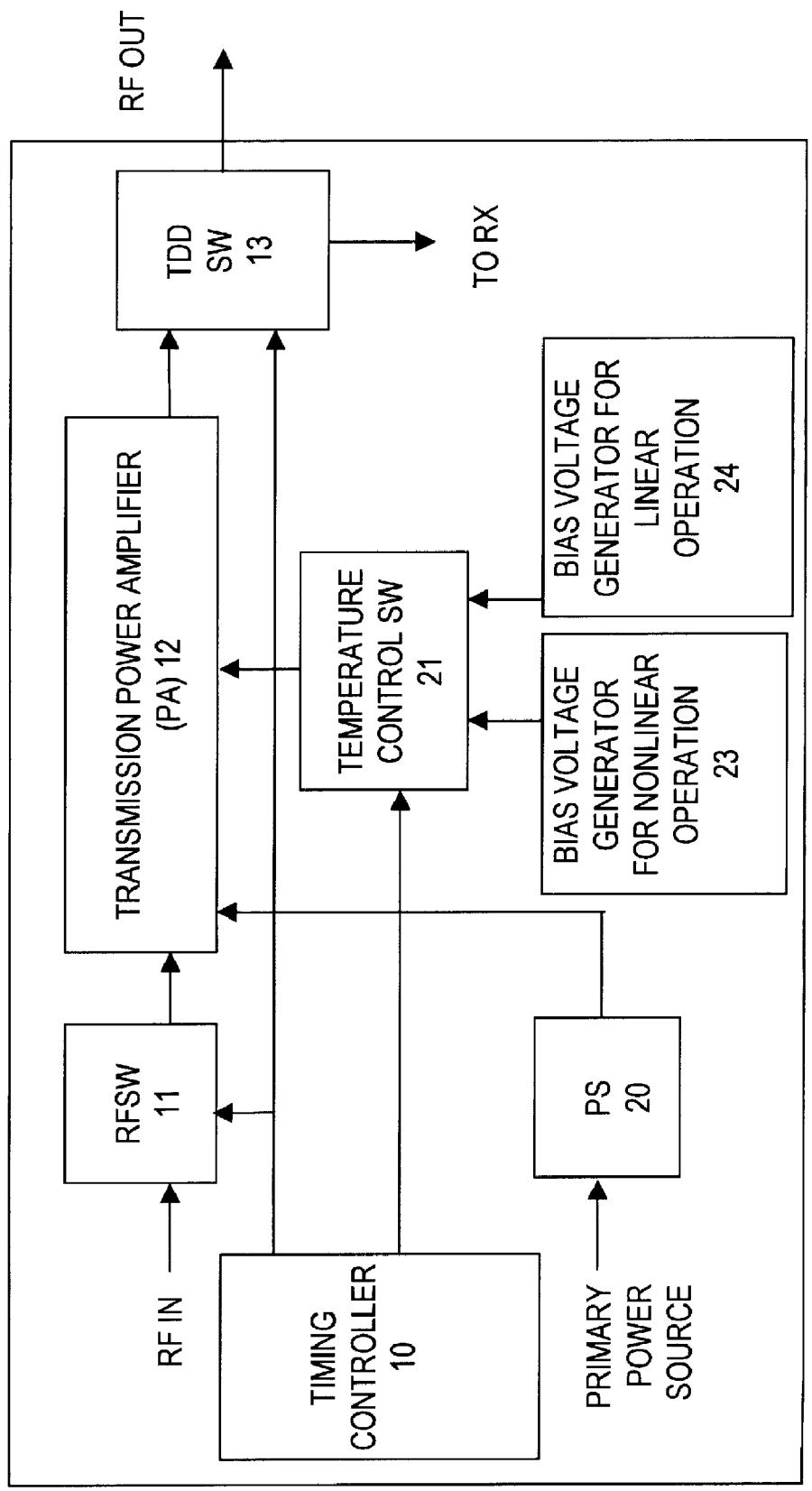
FIG. 13 is a block diagram illustrating a fifth exemplary configuration of the wireless communication device according to an embodiment of the present invention.

FIG. 13 is a block diagram illustrating a fifth exemplary configuration of the wireless communication device according to an embodiment of the present invention. As compared to the first exemplary configuration, in the fifth exemplary configuration, by the application of a bias voltage (gate voltage) for linear amplification to the transmission power amplifier 12 during the reception timing period, the temperature is increased by self-heating, in place of heating by the heater 17. More specifically, in addition to a bias voltage generator 23 for nonlinear operation, which is provided to enable nonlinear operation of the transmission power amplifier 12 (although the bias voltage generator 23 for nonlinear operation is not illustrated in the figures of the first through the fourth exemplary configurations, the bias voltage for nonlinear operation is supplied to the transmission power amplifier 12 to enable nonlinear operation), the transmission power amplifier 12 is provided with a bias voltage generator 24 for linear operation to enable linear operation of the transmission power amplifier 12. In response to the switchover of the transmission/reception timing, the bias voltage is switched. At the transmission timing, to enable nonlinear operation of the transmission power amplifier 12, the bias voltage is supplied from the bias voltage generator 23 for nonlinear operation, as a gate voltage. Accordingly, in the transmission timing period, the transmission power amplifier 12 consumes power according to the transmission signal level. In contrast, in the reception timing period, because of no input of the transmission signal, the transmission power amplifier 12 does not consume power in the state that the bias voltage for nonlinear operation is applied. In the fifth exemplary configuration, by the application of the bias voltage for linear operation as a gate voltage during the reception timing period, and by increasing to a tolerable drain current for the transmission power amplifier 12, power is made consumed even during the reception timing period having no transmission signal input. By this, it becomes possible to increase the temperature of the transmission power amplifier 12 by self-heating.

Figure 14:
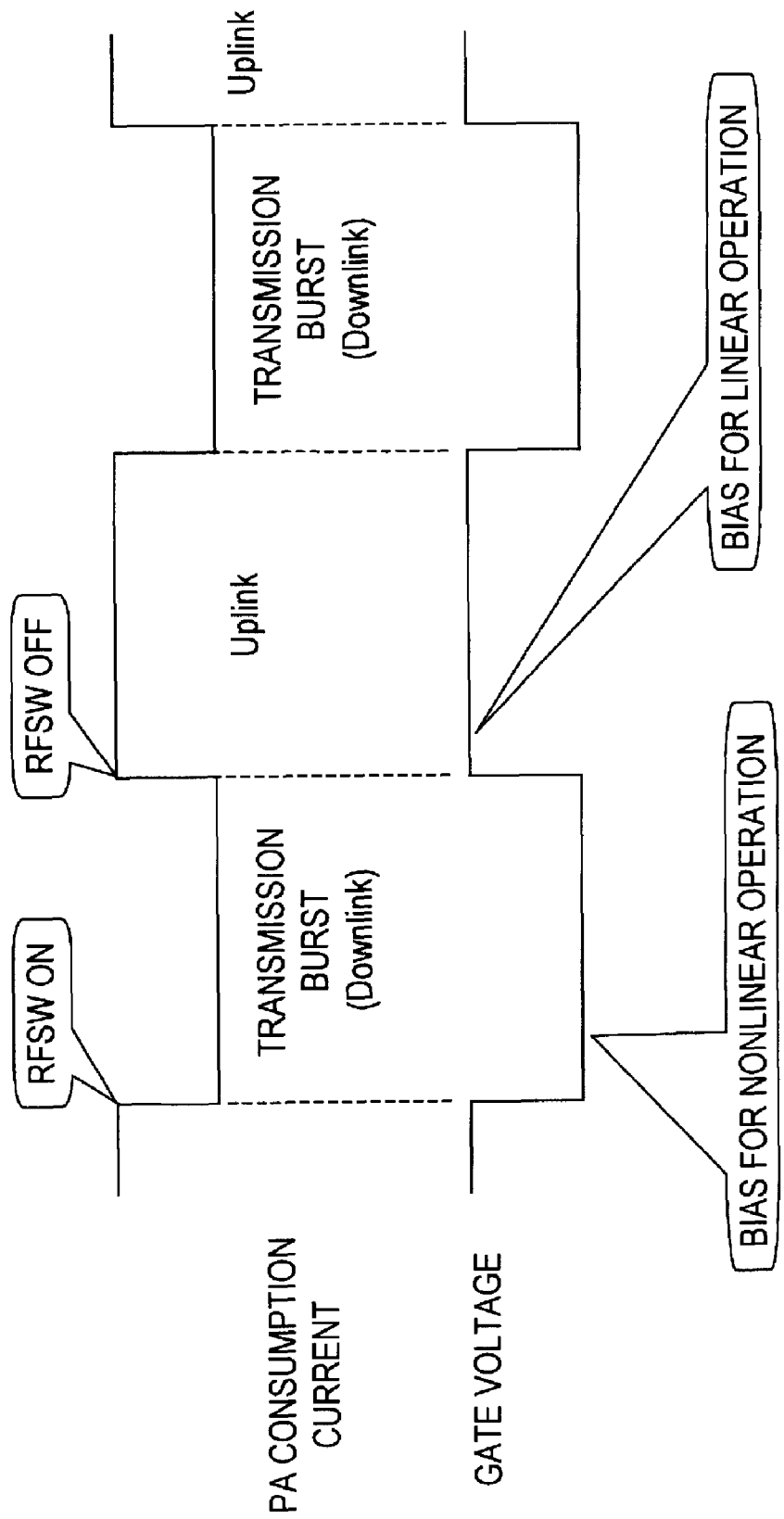
FIG. 14 is a switchover timing chart of the bias voltage.

FIG. 14 is a switchover timing chart of the bias voltage. When the detected temperature is lower than and inclusive of the threshold temperature for heater, the timing controller 10 switches over the bias voltage according to the switchover of the transmission/reception timing. Thus, the bias voltage for nonlinear operation is applied during the transmission timing period, while the bias voltage for linear operation is applied during the reception timing period. This makes the heater 17 unnecessary. When the detected temperature is higher than the threshold temperature for heater, the switchover of the bias voltage is not carried out, and the bias voltage for nonlinear operation is applied even during the reception timing period. Additionally, although the fan 18 is not illustrated in FIG. 13, the fan 18 may be provided, needless to say. The operation of the fan 18 in the above case is similar to the exemplary configuration illustrated in FIG. 1.

According to the embodiments, it is possible to commonly use one power supply for an amplifier and for a heater or a fan, making it unnecessary to provide a power supply dedicated for the heater and the fan to control the temperature of the amplifier. Thus, it is possible to attain a compact mounting area, reduced cost, and reduced power consumption at the time of heating or cooling.

Further, at the time of the switchover of transmission timing and reception timing, it is possible to reduce current and voltage variation in the power supply, enabling a capacity reduction of a capacitor for absorbing the variation.

The wireless communication device according to the embodiments is applicable to a base station of a wireless communication system using the TDD (Time Division Duplex) system, such as WiMax.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A wireless communication device performing wireless communication by switching between transmission timing and reception timing in time division, comprising:

an amplifier that amplifies a transmission signal in a transmission timing period;

a temperature detector that detects temperature of the amplifier;

at least one of a heater that heats the amplifier and a fan that cools the amplifier;

a power supply unit that supplies the amplifier with power;

a switch that switches ON/OFF of the power supply to the heater of the fan; and a timing controller that obtains the temperature detected by the temperature detector, that determine whether the detected temperature is outside a specified temperature range while a time-division switchover between the transmission timing and the reception timing is performed, incase that the detected temperature is outside of the specified range, that outputs a control signal to the switch for supplying the heater or the fan with power supplied from the power supply unit in the reception timing period, and that outputs a control signal to the switch for suspending supplying the heater or the fan with the power supplied from the power supply unit in the transmission timing period.

2. The wireless communication device according to claim 1,
wherein, in case that the temperature detected by the temperature detector is outside the specified temperature range before the time-division switchover between the transmission timing and the reception timing is performed, the timing controller supplies the heater or the fan with the power supplied from the power supply unit, until the temperature detected by the temperature detector becomes inside the specified temperature range.

3. The wireless communication device according to claim 1,
wherein, only when a transmission signal level is lower than and inclusive of a specified level, the timing controller executes control to supply the heater or the fan with the power supplied from the power supply unit in the reception timing period, and to suspend supplying the heater or the fan with the power supplied from the power supply unit in the transmission timing period, where as when the transmission signal level is higher than the specified level, the timing controller does not execute control to supply the heater or the fan with the power supplied from the power supply unit.

4. The wireless communication device according to claim 1, further comprising:
a voltage smoothing unit for smoothing voltage of the power to be supplied from the power supply unit to the heater or the fan.

5. The wireless communication device according to claim 1,
wherein the timing controller controls an output voltage of the power supply unit to be variable, according to the detected temperature by the temperature detector.

6. A wireless communication device performing wireless communication by switching between transmission timing and reception timing in time division, comprising:
an amplifier that amplifies a transmission signal in a transmission timing period;
a fan that cools the amplifier;
a power supply unit that supplies the amplifier with power;
a switch that switches ON/OFF of the power supply to the heater of the fan; and
a timing controller that outputs a control signal to the switch for supplying the fan with power supplied from the power supply unit in the reception timing period, and that outputs a control signal to the switch for suspending supplying the fan with the power supplied from the power supply unit in the transmission timing period.

7. A wireless communication device performing wireless communication by switching between transmission timing and reception timing in time division, comprising:
an amplifier that amplifies a transmission signal in a transmission timing period;
a temperature detector that detects temperature of the amplifier;
a power supply unit that supplies the amplifier with power;
a first bias voltage generator that generates a first bias voltage to allow the amplifier to perform nonlinear operation;
a second bias voltage generator that generates a second bias voltage to allow the amplifier to perform linear operation;
a switch that switches the supply of the first bias voltage and the second bias voltage to the amplifier; and
a timing controller that obtain the temperature detected by the temperature detector, that determine whether the detected temperature is outside a specified temperature range while a time-division switchover between the transmission timing and the reception timing is performed, incase that the detected temperature is outside of the specified range, that outputs a control signal to the switch for supplying the second bias voltage to the amplifier in the reception timing period, and that outputs a control signal to the switch for supplying the first bias voltage to the amplifier in the transmission timing period.

\* \* \* \* \*